Patented Nov. 15, 1927.

1,649,520

UNITED STATES PATENT OFFICE.

CASIMIR FUNK AND HARRY E. DUBIN, OF NEW YORK, N. Y., ASSIGNORS, BY MESNE ASSIGNMENTS, TO H. A. METZ LABORATORIES, INC., OF NEW YORK, N. Y., A CORPORATION OF NEW YORK.

PROCESS OF OBTAINING VITAMINS AND PRODUCT.

No Drawing.   Application filed May 13, 1922. Serial No. 560,765.

This invention relates to the treatment of cod liver oil or its derivatives or yeast and other vitamin containing materials or extracts thereof for the purpose of stabilizing the active moiety or active principle of the material, herein called vitamin, and rendering it separable from the bulk of the inactive material.

We have found that the vitamin content of vitamin containing materials can be stabilized and rendered separable from the bulk of the material in which it is contained by reduction, preferably by hydrogenation in the presence of a catalytic body.

The process hereinafter illustrated by a disclosure of a specific procedure which may be employed for the treatment of cod liver oil is of general application for the isolation of vitamins from other materials although, as will be understood by one skilled in the art, the details of procedure will vary with the characteristics of the raw vitamin containing material under consideration.

The process comprises in general two operations or parts (1) the reduction or hydrogenation and (2) separation of the vitamin or a vitamin concentrate from the hydrogenated mixture. The procedure for reduction and to a greater extent the procedure for separating vitamin from the reduced mixture will vary with the different materials treated.

*Example.*—20 grams of cod liver oil are emulsified with 10 grams of gum arabic in 400 cubic centimeters of water and 1 gram of colloidal palladium is added. The mixture is then subjected to the action of hydrogen under 10 pounds pressure at a temperature of 60° C. until the absorption of hydrogen in the mixture substantially ceases. The hydrogenated or hardened oil is separated from the reaction mixture in any suitable manner, for instance, by filtration or centrifugation and is extracted with chloroform. On evaporating the excess of chloroform from the chloroform extract the hardened oil crystallizes out as a white solid having a melting point of 55° C. The yield of hardened oil is practically quantitative. The crystallized hardened oil is repeatedly extracted with alcohol and ether whereby about 96.5 percent of the solidified oil is dissolved and eliminated leaving a residue of about 3.5 percent of solidified oil having a melting point of 25° C. which contains practically all of the vitamin which was present in the original unreduced oil. This residue or active or vitamin containing fraction gives the usual characteristic cholesterol reactions and contains a large proportion of cholesterol derivatives. It may be further purified and concentrated if desired by use of the digitonin or other saponin precipitation in the known manner.

In the separation of the active or vitamin containing fraction from the bulk of the reduced or hardened oil solvents other than alcohol and ether such as chloroform, xylol, toluol, petroleum ether, etc., which selectively dissolve the hydrogenated oil may and preferably are employed in the series of extractions.

It is to be understood that the invention is not limited to the use of palladium as the reducing or hydrogenation catalyst. Other catalysts may be employed. Other reducing agents may also be employed.

The vitamin concentrate produced according to our invention contains some of the essentials of an adequate diet and is of value as a supplement to one's diet particularly in cases indicating an insufficient supply of vitamins.

We claim:

1. Process of stabilizing the vitamin content of vitamin-containing materials which comprises subjecting said material to a mild hydrogenation at a temperature insufficient to destroy the vitamin.

2. Process of stabilizing the vitamin content of vitamin-containing materials which comprises subjecting said materials to a mild hydrogenation at a temperature insufficient to destroy the vitamin in the presence of a catalytic body.

3. Process of stabilizing the vitamin content of vitamin-containing materials which comprises subjecting said materials to a mild hydrogenation at a temperature insufficient to destroy the vitamin in the presence of colloidal palladium.

4. Process of stabilizing and concentrating the vitamin content of vitamin-containing materials which comprises subjecting said materials to a mild hydrogenation at a temperature insufficient to destroy the vitamin, and separating the resulting stabilized vitamin from the bulk of said materials.

5. Process of stabilizing and concentrating the vitamin content of vitamin-containing materials which comprises subjecting said materials to a mild hydrogenation at a temperature insufficient to destroy the vitamin, and separating the resulting stabilized vitamin from the bulk of said materials by fractional crystallization and selective extraction with a solvent.

6. Process of obtaining vitamins from cod liver oil which comprises, emulsifying the oil with water, hydrogenating the oil in the presence of colloidal palladium, separating the resulting hardened oil from the reaction mixture, and extracting the same with alcohol and ether, and other solvents.

7. Process of obtaining vitamins from cod liver oil which comprises, hydrogenating the oil, separating the bulk of the hydrogenated oil from a fraction thereof containing the bulk of the vitamin content of the oil by fractional crystallization and extraction with solvents, and further purifying and concentrating the vitamin content of said fraction by the saponin precipitation.

8. Process of obtaining a vitamin concentrate from cod liver oil which comprises, emulsifying the oil with water and hydrogenating the oil in the presence of colloidal palladium, separating the hydrogenated oil from the reaction mixture and crystallizing the same from a solution in chloroform, extracting the crystallized product with alcohol and ether, and purifying the undissolved residue by the digitonin precipitation.

9. A stabilized vitamin concentrate such as may be prepared by the hereindescribed process which comprises, hydrogenating cod liver oil in the presence of colloidal palladium, separating the bulk of the hydrogenated oil from a fraction thereof containing the bulk of the vitamin content of the oil by fractional crystallization from chloroform and extracting the crystallized product with alcohol and ether, and further purifying the fraction thus obtained by subjecting it to the digitonin or other saponin precipitation.

10. A stabilized vitamin concentrate such as may be prepared by the hereindescribed process which comprises subjecting vitamin-containing materials to a mild hydrogenation at a temperature insufficient to destroy the vitamin and separating the resulting stabilized vitamin from the bulk of said materials.

11. A vitamin-containing product derived from cod liver oil comprising a vitamin which has been subjected to hydrogenation, 3.5 parts of said material having substantially the same vitamin activity as 100 parts of cod liver oil.

12. As a new product a material comprising vitamins stabilized by hydrogenation.

In testimony whereof, we affix our signatures.

CASIMIR FUNK.
HARRY E. DUBIN.